United States Patent [19]

Nakayama

[11] 4,356,510

[45] Oct. 26, 1982

[54] TELEVISION SOUND MULTIPLEX SIGNAL RECEIVING DEVICE

[75] Inventor: Koichi Nakayama, Hatoyama, Japan

[73] Assignee: Toko Kabushiki Kaisha, Tokyo, Japan

[21] Appl. No.: 103,559

[22] Filed: Dec. 13, 1979

[30] Foreign Application Priority Data

Dec. 14, 1978 [JP] Japan ............................. 53-155520
Dec. 14, 1978 [JP] Japan ............................. 53-155521
Mar. 8, 1979 [JP] Japan ........................... 54-29629[U]

[51] Int. Cl.³ ............................................. H04N 5/60
[52] U.S. Cl. ................................. 358/143; 358/144; 358/198
[58] Field of Search ............... 358/141, 142, 143, 144, 358/197, 198, 11, 12; 455/227, 228

[56] References Cited

U.S. PATENT DOCUMENTS 3,221,098 11/1965 Feldman ............................ 358/143
3,924,060 12/1975 Bedford ............................. 358/142
4,079,419 3/1978 Siegle ................................. 358/143
4,139,866 2/1979 Wegner ............................. 358/144

OTHER PUBLICATIONS

"Integrated Circuits for TV Multiplex Sound Receiver", pp. 31-43, Yamada, et al., J. Inst. TV Engrs. of Japan, vol. 27 #1, 1973.

Primary Examiner—Michael A. Masinick
Attorney, Agent, or Firm—Wenderoth, Lind & Ponack

[57] ABSTRACT

In a television sound multiplex broadcast signal receiving device, an AM detector outputs a control signal which modulates a 55.1 KHz sub-carrier signal; a reference signal inputted to a counter circuit is controlled at time intervals of the control signal; the reference signal is counted, and a stereophonic broadcast, a different program broadcast and a monaural broadcast are discriminated with the aid of an information signal outputted by the counter circuit and the 55.1 KHz sub-carrier signal.

11 Claims, 11 Drawing Figures

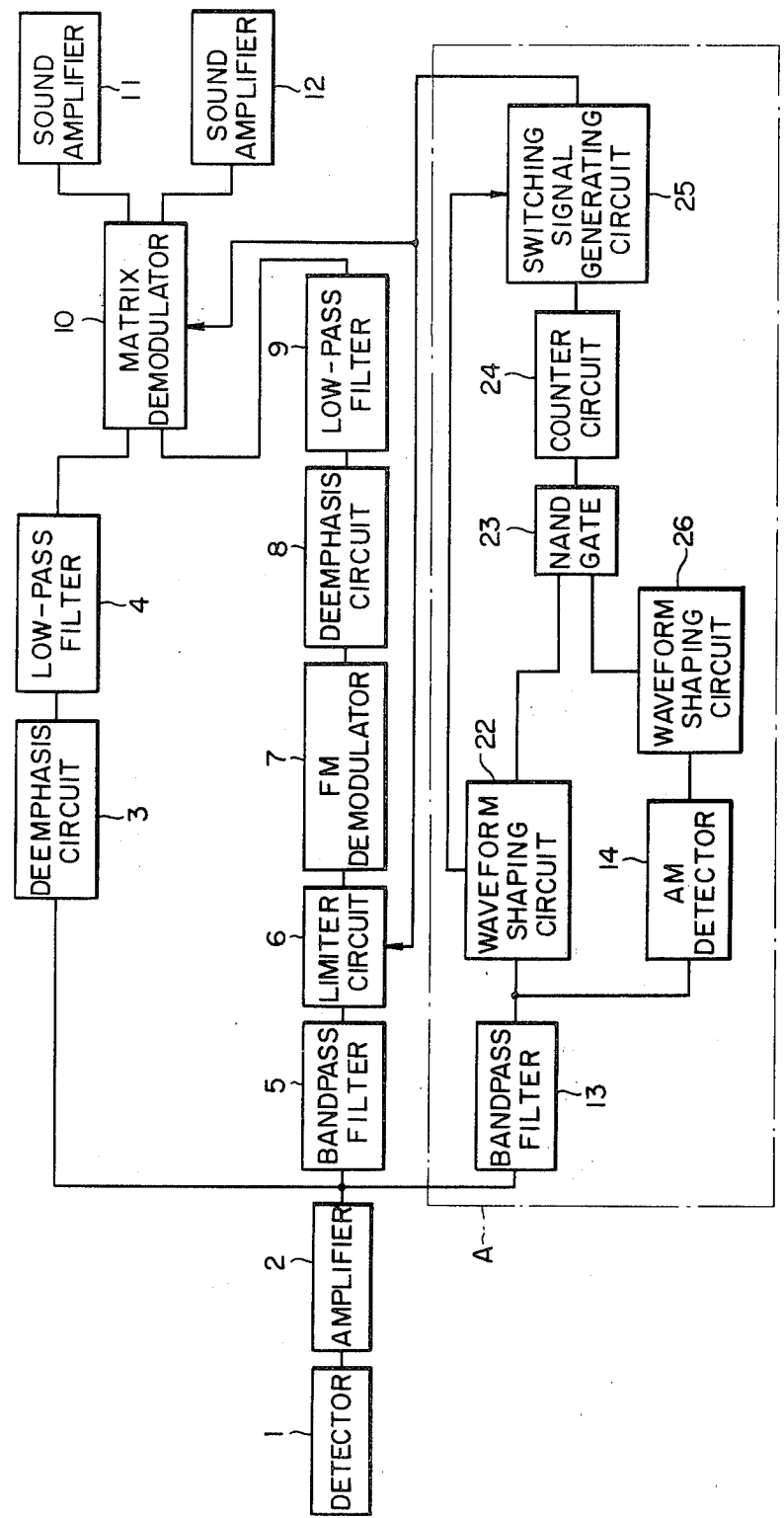
F I G. 4

TELEVISION SOUND MULTIPLEX SIGNAL RECEIVING DEVICE

BACKGROUND OF THE INVENTION

This invention relates to an audio signal receiving device in a television broadcast signal receiving set.

In general, monaural broadcasting has been mainly employed in television broadcasts. However, signal transmission and reception such as stereophonic broadcasting and different program broadcasting (such as audio signal broadcasting as in dubbing, simultaneous interpretation and two-language broadcasts) have been experimented with and put into practical use.

The standard television sound multiplex signal broadcasting system, as shown in a frequency spectrum in FIG. 1, is an FM-FM television sound multiplex system in which the main channel signal has a frequency band of from 50 Hz to 15 KHz, and the auxiliary channel signal is a sub-carrier (about 31.5 KHz) two at times the horizontal synchronizing frequency which is frequency-modulated with a sub-audio signal, the frequency band of the auxiliary channel signal being from 16 KHz to 47 KHz. The control channel signal is obtained by modulating the control sub-carrier signal having a frequency (about 55.1 KHz) which is 3.5 times the horizontal synchronizing frequency with two control signals at 922.5 Hz and 982.5 Hz which are practically utilized at present. That is, it can be determined from the control signals (922.5 Hz and 982.5 Hz) whether an audio signal applied to a television set is of stereophonic broadcasting or monaural broadcasting. More specifically, reception of the 982.5 Hz control signal indicates that the television audio signal is of different program broadcasting, and reception of the control signal 982.5 Hz indicates that it is of stereophonic broadcasting.

A conventional, ordinary television sound multiplex signal receiving device will be described with reference to FIG. 2.

A television audio signal is outputted by a detector 1 and is then amplified by an amplifier 2. The frequency bands as indicated in FIG. 1 are outputted. The main channel signal is applied through a de-emphasis circuit 3 to a low-pass filter 4. The auxiliary channel signal is applied through a band pass filter 5, a limiter circuit 6, an FM demodulator 7, and a de-emphasis circuit 8 to a low pass filter 9. The control channel signal is applied through a band pass filter 13 to an AM detector 14, and the control signal (922.5 Hz or 982.5 Hz) outputted by the AM detector 14 is applied to reed filters 15 and 17. More specifically, when the 922.5 Hz control signal is applied to the television set, the control signal passes through the reed filter 15 and is then amplified by an amplifier 16. As a result, the squelch is released, the auxiliary channel system is operated and the different program broadcast signal receiving condition is established. On the other hand, when the 982.5 Hz control signal is applied to the television set, the control signal passes through the reed filter 17 and is then amplified by an amplifier 18, the output of which releases the squelch condition. As a result, the auxiliary channel signal system is operated, a drive circuit 19 is operated to drive a relay 20, whereby a matrix demodulator 10 is operated and the stereophonic broadcast signal receiving condition is established. In FIG. 2, reference numerals 11 and 12 designate sound amplifiers.

In an ordinary television sound multiplex broadcast signal receiving device as described above, the control signals are detected by the reed filters 15 and 17. Recently, semiconductor integrated circuits have been extensively employed for manufacturing reproducing equipment such as television sets, and it is essential to reduce the manufacturing cost. However, in a television set employing reed filters, the number of components is increased, the percentage of the area occupied by the reed filters with respect to the total area of the circuit board is uneconomically increased, and it takes a relatively long time to adjust the reed filters. Thus, a conventional, ordinary television set tends to increase its manufacturing cost.

In order to overcome the difficulty, a method has been proposed in which the two control signals are discriminated by digitally processing them, so that the television set can be made up of semiconductor integrated circuits as in the present invention.

However, the two control signals are relatively close in frequency to each other, and the phase difference between the two control signals is very small. In addition, as is clear from FIG. 1, the electric field strength of the control channel signal is weaker than those of the main channel signal and the auxiliary channel signal. Accordingly, the control channel signal is liable to be affected, or to be subjected to cross modulation interference, by the side bands or by other broadcasting signals. Even if the control channel signal subjected to cross modulation interference is shaped into a pulse signal, the waveform of the pulse signal is deformed or delayed in phase, with the result that the two control signals cannot be distinguished from each other. Accordingly, it is necessary to make the characteristic of the band pass filter steep; that is, the arrangement of the band pass filter must be an intricate combination of double tuning coils or triple tuning coils, which leads to an increase in manufacturing cost. Particularly, it takes a relatively long time to adjust such a band pass filter. Thus, the method of discriminating the control signals by converting them into digital data signals suffers from various problems to be solved.

SUMMARY OF THE INVENTION

Accordingly, an object of the invention is to provide for a television sound multiplex signal receiving device in which the above-described control signals are digitally processed by shaping them into pulse signals so that stereophonic broadcasting and monaural broadcasting are clearly discriminated from each other.

Another object of the invention is to provide a semiconductor integrated circuit for a television set, which can be combined with other semiconductor integrated circuits of the television set by digitally discriminating the control signals as described above.

A further object of the invention is to provide a television sound multiplex broadcast signal receiving device which is capable of preventing the erroneous operation which is liable to be caused in such a television sound multiplex broadcast signal receiving device employing the above-described method of digitally discriminating the control signals.

The foregoing objects and other objects of the invention have been achieved by the provision of a television sound multiplex broadcast signal receiving device in which a pulse reference signal is counted by a counter circuit at time intervals of control signals to detect the difference between the control signals, to determine which one of a stereophonic broadcast signal and a different program broadcast signal is received by a television set, whereby, when a television sound signal is received by the television set, but no control signals are received thereby, a monaural broadcast signal reception condition is established. For this purpose, the device according to the invention comprises: a control signal detecting circuit having a function of detecting the arrival of the control signals and a function of discriminating the difference between the control signals; and a switching signal generating circuit for selecting one of the stereophonic broadcast, different program broadcast and monaural broadcast according to the discrimination signal. These processing operations are carried out in a digital mode by utilizing the pulse reference signal and the control signals. Circuits for the processing operations are constituted by semi-conductor integrated circuits. Especially, if the counter circuit is made up of an integrated injection logic, then the provided television sound multiplex broadcast signal receiving device is more effective in operation. Furthermore, the device according to the invention is excellent in operation, because erroneous operation, which is liable to be involved in a digital processing method, can be prevented by means adapted to sample an information signal provided by the counter circuit at time intervals of the control signal.

The foregoing objects and other objects as well as the characteristic features of the present invention will become more apparent from the following detailed description and the appended claims when read in conjunction with the accompanying drawings, in which like parts are designated by like reference numerals or characters.

BRIEF DESCRIPTION OF THE DRAWINGS

In the accompanying drawings:

FIGS. 3 and 4 are block diagrams showing examples of a television sound multiplex broadcast signal receiving device according to this invention;

DETAILED DESCRIPTION OF THE INVENTION

One example of a television sound multiplex broadcast signal receiving device according to this invention will be described with reference to FIGS. 3 to 10.

Figure 3:
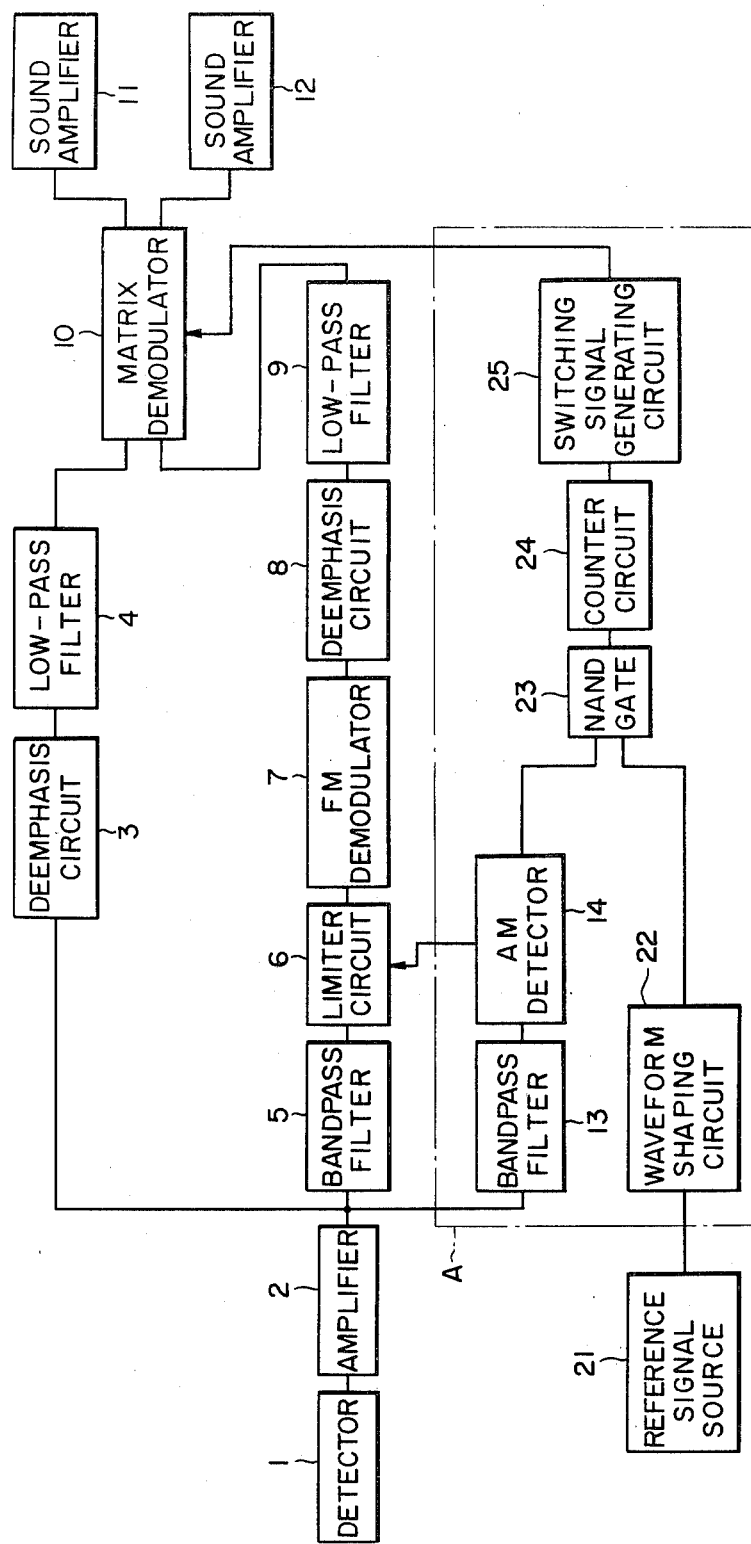

As shown in FIG. 3, an audio signal in television broadcast outputted by a detector 1 is amplified by an amplifier 2 and is then separated into a main channel signal, an auxiliary channel signal and a control channel signal. The main channel signal is applied through a de-emphasis circuit 3 to a low-pass filter 4. The auxiliary channel signal is applied to a bandpass filter 5, a limiter circuit 6, an FM demodulator 7, a de-emphasis circuit 8 and a low-pass filter 9 in the stated order. The control channel signal is applied through a band-pass filter 13 to an AM detector 14, where it is subjected to waveform shaping as desired and is than applied to one input terminal of a NAND gate 23, to the other input terminal of which a reference signal generated by a reference signal source 21 is applied through a waveform shaping circuit 22. The output pulse of the NAND gate 23 is supplied to a counter circuit 24. When a 922.5 Hz control signal is applied, the counter circuit 24 outputs an information signal, so that the operation of a matrix demodulator 10 is suspended by the output of a switching signal generating circuit 25, to release the squelch of the auxiliary channel signal system, thereby to establish its operating state. The main channel signal system and the auxiliary channel signal system are so set as to operate individually, whereby a different program broadcast signal receiving state is established. On the other hand, when a 982.5 Hz control signal is applied, the squelch of the auxiliary channel signal system is released, whereby the system is placed in an operating state while the matrix demodulator 10 is operated so that a stereophonic broadcast signal receiving state is established. With respect to the squelch releasing signal, in FIG. 3, the squelch of the auxiliary channel signal system is released by the output of the AM detector 14. However, there are various methods of releasing the squelch of the auxiliary channel signal system, and therefore the invention is not limited to the method described with reference to FIG. 3.

The reference signal source 21 may be made up of a crystal oscillator or an RC oscillator. However, it should be noted that various stabilized signal sources are incorporated in a television set, and it is convenient to employ the horizontal synchronizing signal as the reference signal source when a television sound multiplex broadcast signal receiving device is incorporated in a television set.

Figure 6:
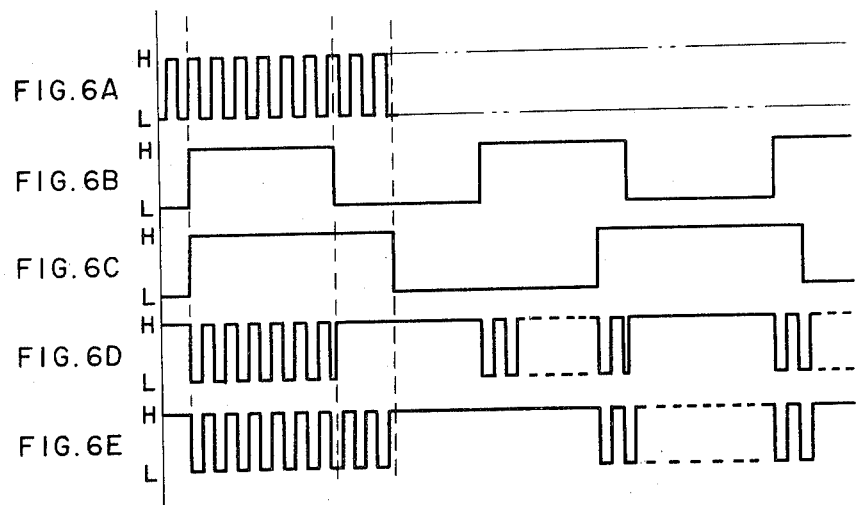
FIGS. 6A through 6E are timing charts for a description of a fundamental principle of discrminating the above-described control signals.

A method of discriminating the control signals will be described with reference to FIG. 6. FIG. 6A shows the waveform of the reference signal source such as a horizontal synchronizing signal; FIG. 6B shows the waveform of the 982.5 Hz control signal, and FIG. 6C shows the waveform of the 922.5 Hz control signal. When the signal in FIG. 6A and the signal in FIG. 6B or 6C are applied to the NAND gate 23, the output of the NAND gate 23 is as indicated in FIG. 6D or 6E respectively. Accordingly, it can be determined which one of the control signals is applied, by counting the output pulses of the NAND gate with the counter circuit 24.

In the method described with reference to FIG. 6, the horizontal synchronizing signal is employed as the reference signal; however, it should be noted that the invention is not limited thereto or thereby. That is, a method may be employed, in which the control sub-carrier signal amplitude-modulated by the control signal is converted into a pulse signal, which is applied to the counter circuit at the time intervals of the control signal. The latter method will be described in more detail. In this connection, not only the signal sources described above but also various other stable signal sources in a television set may be used as the reference signal.

Figure 1:
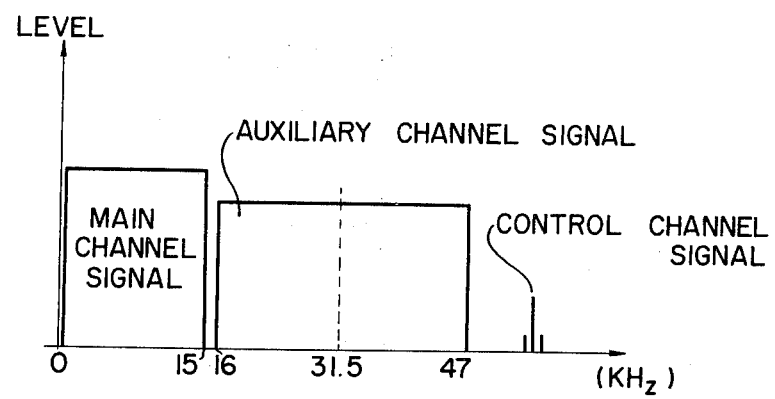
FIG. 1 is a diagram showing a frequency spectrum in the standard television sound multiplex signal broadcasting system.
Figure 2:
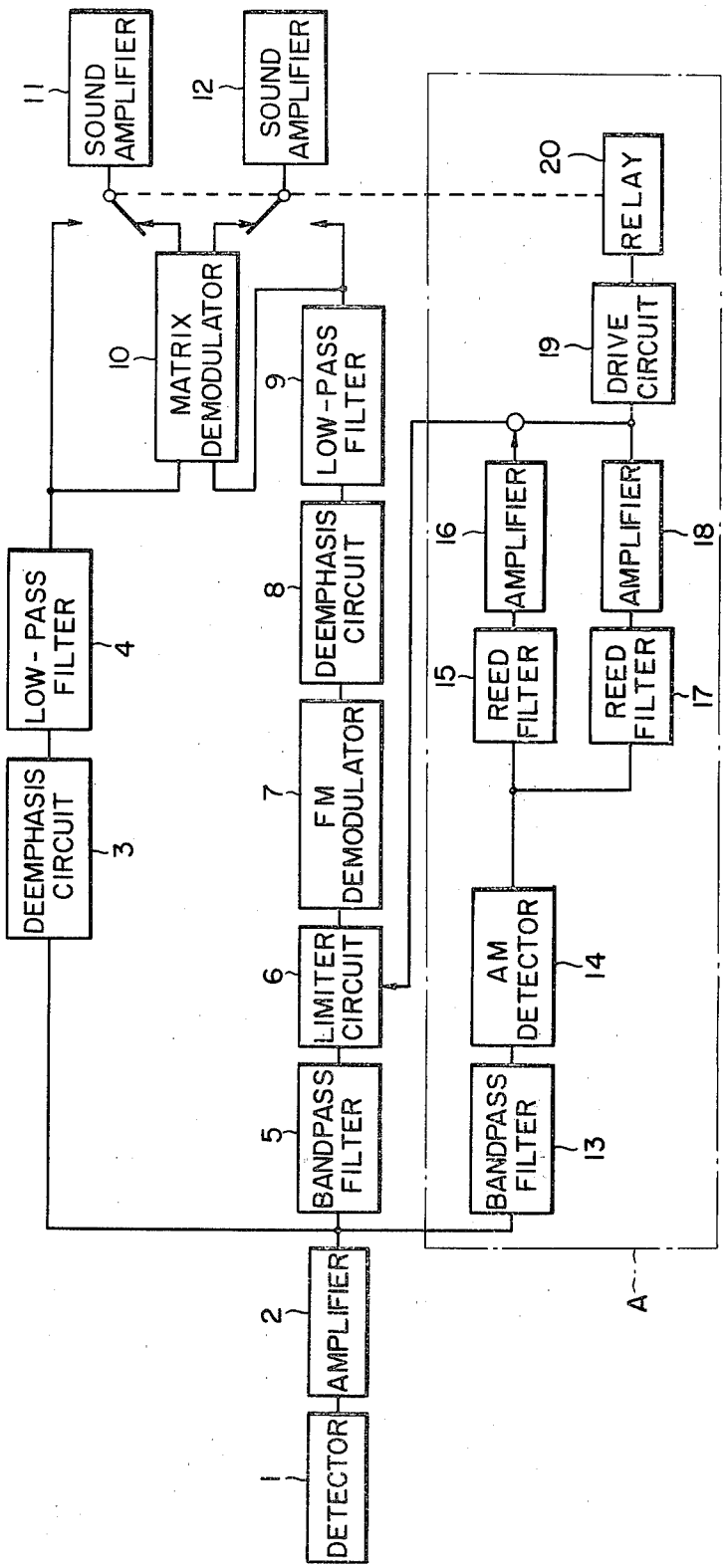
FIG. 2 is a block diagram showing a conventional television sound multiplex broadcast signal receiving device.

Shown in FIG. 4 is another example of the television sound multiplex broadcast signal receiving device according to the present invention, in which a 55.1 KHz sub-carrier signal is employed as its reference signal source. Among the audio signals of the television broadcast signal, the main channel signal and the auxiliary channel signal pass through the same circuits as those in FIG. 2 or 3, and therefore their detailed descriptions will be omitted.

In the control channel signal system, the 55.1 KHz sub-carrier signal passed through the band-pass filter 13 is applied to the waveform shaping circuit 22, where it is pulsed-shaped and is then applied to the NAND gate 23. Since the 55.1 KHz sub-carrier signal is amplitude-modulated with the control signals (922.5 Hz and 982.5 Hz), the control signals can be obtained by applying the 55.1 KHz sub-carrier signal to the AM detector 14. The output of the AM detector 14 is applied to a waveform shaping circuit 26, where it is waveform-shaped with desired time intervals, and the resultant signal is applied to the NAND circuit 23, the output of which is in turn applied to the counter circuit 24.

On the other hand, the 55.1 KHz sub-carrier signal passed through the band pass filter 13 is also supplied to the waveform shaping circuit 22, where it is pulse-shaped, and is then applied to the NAND gate 23. The output of the NAND gate 23 is supplied to the counter circuit 24. The counter circuit 24 is so designed that it outputs an information signal only when the 922.5 Hz control signal is applied to the signal receiving device. The information signal representative of the arrival of the 922.5 Hz control signal is applied to the switching signal generating circuit 25, to control the matrix demodulator 10. The function of the switching signal generating circuit 25 is similar to that of the switching signal generating circuit 25 in FIG. 3.

Figure 5:
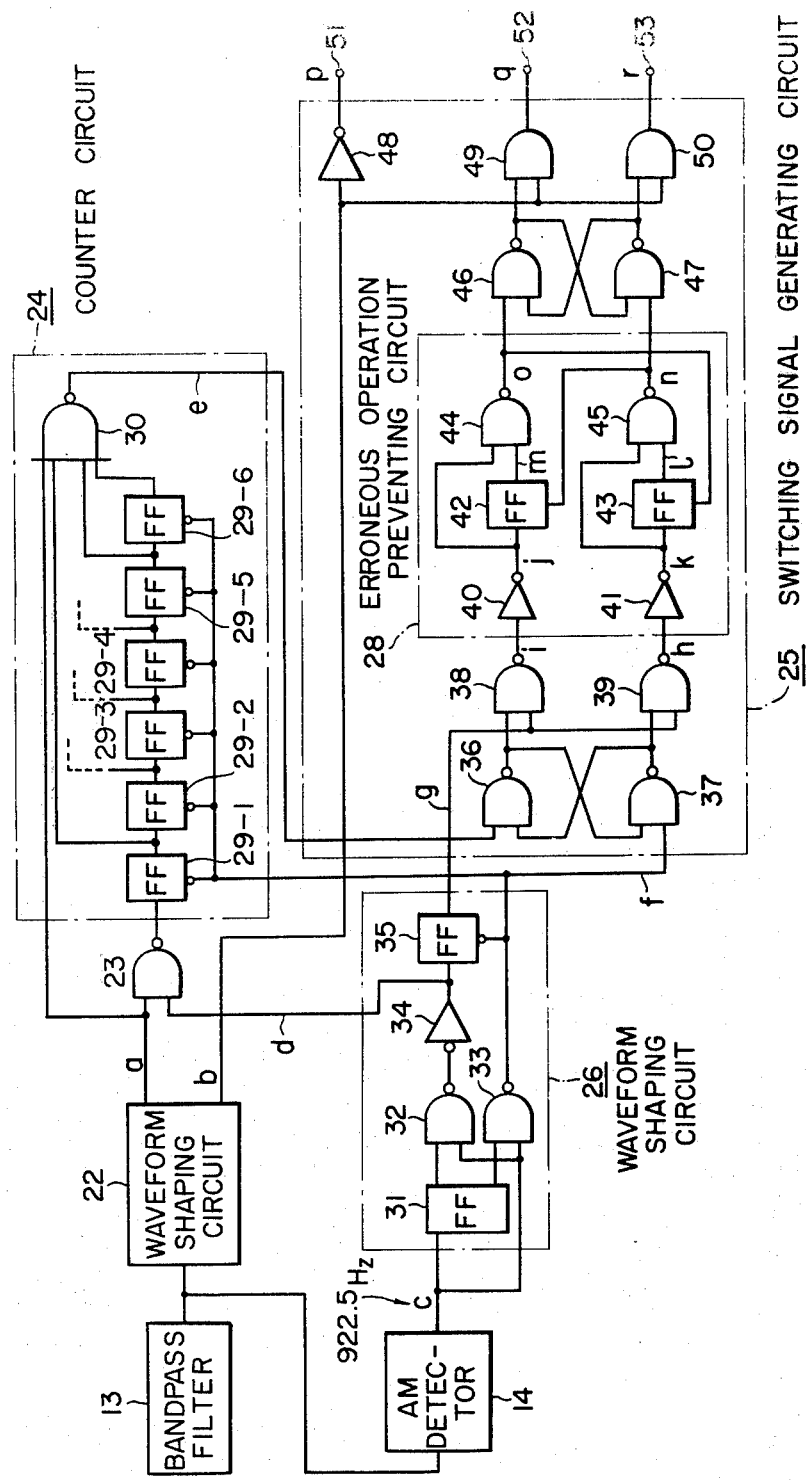
FIG. 5 is also a block diagram showing one example of a control signal discriminating circuit section and a switching signal generating circuit section for selecting a stereophonic broadcast, a different program broadcast and a monaural broadcast in the television sound multiplex broadcast signal receiving device.

FIG. 5 shows a concrete example of the control signal detecting section and the switching signal generating circuit section (generally indicated by "A" in FIG. 3) of the television sound multiplex broadcast signal receiving device, and an erroneous operation preventing circuit 28. The output signals of the various circuit elements are indicated by a through r in FIG. 5.

The output of the detector 13 is applied to the waveform shaping circuit 22. One output a of the circuit 22 is applied to the NAND gate 23, and the other output b is applied to the switching signal generating circuit 25. The control signal c outputted by the AM detector 14 is applied to the waveform shaping circuit 26 which is made up of flip-flop circuits 31 and 35, NAND gates 32 and 33, and an inverter 34. The output signal d of the inverter 34 is supplied to the NAND gate 23, the output of which is in turn supplied to the counter circuit 24. The counter circuit 24 comprises six flip-flop circuits 29-1 through 29-6 and a NAND gate 30. An information signal e provided by the counter circuit 24 is applied to the switching signal generating circuit 25. The counter circuit 24 is so designed that it outputs the information signal when the 922.5 Hz control signal is applied.

However, with respect to the information signal e outputted by the counter circuit 24, sometimes the control signal sub-carrier suffers from cross modulation interference, and the control signal waveform-shaped is therefore deformed (split) with respect to its pulse wave-form or shifted in phase, whereby the counter circuit 24 may operate erroneously. In order to eliminate the difficulty, the erroneous operation preventing circuit 28 is provided in the switching signal generating circuit 25.

Figure 7:
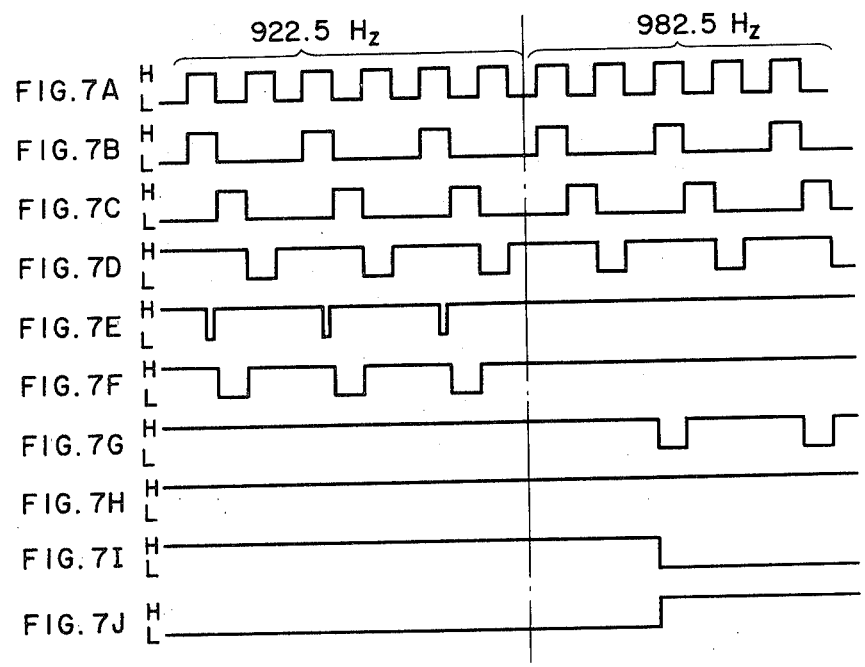
FIGS. 7A through 7J are timing charts for a description of the change of signal receiving condition from the reception of a 922.5 Hz control signal to the reception of a 982.5 Hz control signal.

The operation of the circuit shown in FIG. 5 will be described with reference to time charts shown in FIGS. 7 and 8. FIG. 7 shows the waveforms of various signals under the normal operating condition.

As indicated in FIG. 7A, the 922.5 Hz control signal is provided as the output signal c which represents that a different program broadcast is being carried out, and thereafter it is changed to the 982.5 Hz control signal. One output signal d of the waveform shaping circuit 26 is as shown in FIG. 7B, and the remaining output signals g and f of the waveform shaping circuit 26 are as indicated in FIGS. 7C and 7D, respectively. When the 922.5 Hz control signal is applied, the pulses passed through the NAND gate 23 are counted by the counter circuit 24, and the information signal e provided by the counter 24 is as indicated in FIG. 7E. Upon arrival of the 982.5 Hz control signal, no information signal e is outputted as indicated in FIG. 7E. When the 922.5 Hz control signal is applied, the information signal e is inputted to an R-S type flip-flop circuit consisting of NAND gates 36 and 37, the outputs of which are supplied to NAND gates 38 and 39, respectively. The output signal i of the NAND gate 38 is as shown in FIG. 7F.

Since the 55.1 KHz sub-carrier signal has been applied, the output signal b is maintained at a high logic level (hereinafter referred to merely as "H" when applicable) as indicated in FIG. 7H. The output signal q is held at "H" as shown in FIG. 7I. When the 982.5 Hz control signal is applied so that no information signal e is outputted with the result that the output signal i of the NAND gate 38 is set to "H", then the output signal h of the NAND gate 39 is provided as indicated in FIG. 7G, and the output q of the AND gate 49 is switched from "H" to a low logic level (hereinafter referred to merely as "L" when applicable) in response to the arrival of the 982.5 Hz control signal. On the other hand, the output signal r of the AND gate 50, being provided as indicated in FIG. 7J, is switched from "L" to "H". Thus, the different program broadcast signal receiving condition is changed to the stereophonic broadcast signal receiving condition.

The operation of the circuitry shown in FIG. 5 in which the erroneous operation preventing circuit 28 is incorporated in the switching signal generating circuit 25 will be described with reference to FIG. 8 which is a timing chart indicating the waveforms of various signals.

The erroneous operation preventing circuit 28 comprises inverters 40 and 41, flip-flop circuits 42 and 43, and NAND gates 44 and 45.

Figure 8:
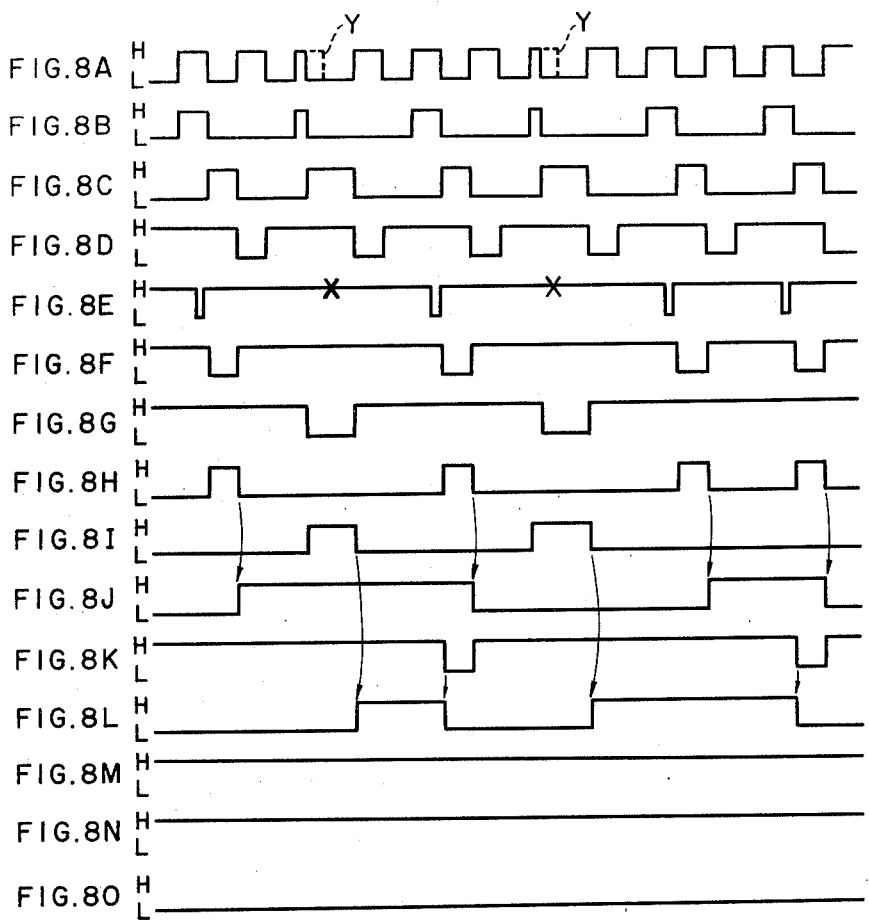
FIGS. 8A through 8P are timing charts for a description of the operating conditions of a television set when an erroneous operation signal is mixed under the condition that the 922.5 Hz control signal is being received.

FIG. 8 shows the case where the 922.5 Hz control signal is applied. The output waveform is affected by cross modulation interference, and the portions "Y" (indicated by the dotted lines) thereof are removed. Accordingly, the output signal d of the waveform shaping circuit 26 is as indicated in FIG. 8B, and therefore the output signals g and f are as shown in FIGS. 8C and 8D, respectively. If it is assumed that the information signal e of the counter circuit 24 is affected by erroneous operation (as indicated by "X" in FIG. 8E), then the output signal i of the NAND gate 38 is as shown in FIG. 8F, and the output signal h of the NAND gate 39 is as indicated in FIG. 8G. These outputs are applied to the inverters 40 and 41, so that the levels thereof are inverted as shown in FIGS. 8H and 8I, respectively.

The output signal m of the flip-flop circuit 42 is controlled by the output signal j (FIG. 8H) of the inverter 40 as indicated in FIG. 8J. On the other hand, the output signal l of the flip-flop circuit 43 is controlled by the output signal k of the inverter 41 and the output signal o (FIG. 8K) of the NAND gate 44, as a result of which the output signal l has a waveform as indicated in FIG. 8L. Therefore, the waveform of the output signal n of the erroneous operation preventing circuit 28 is as illustrated in FIG. 8M. Since these output signals o and n are applied to an R-S type flip-flop circuit consisting of the NAND gates 46 and 47, the output signal q of the AND gate 49 is maintained at "H" as shown in FIG. 8N when the 922.5 Hz control signal is applied as indicated in FIG. 8, thus indicating the arrival of the 922.5 Hz control signal. The monaural broadcast signal receiving condition is established by an output signal p through the output terminal 51. The output signal q through the output terminal 52 indicates the arrival of the 922.5 Hz control signal, to establish the different program broadcast signal receiving condition. The output signal r through the output terminal 53 indicates the arrival of the 982.5 Hz control signal, to establish the stereophonic broadcast signal receiving condition.

Figure 9A:
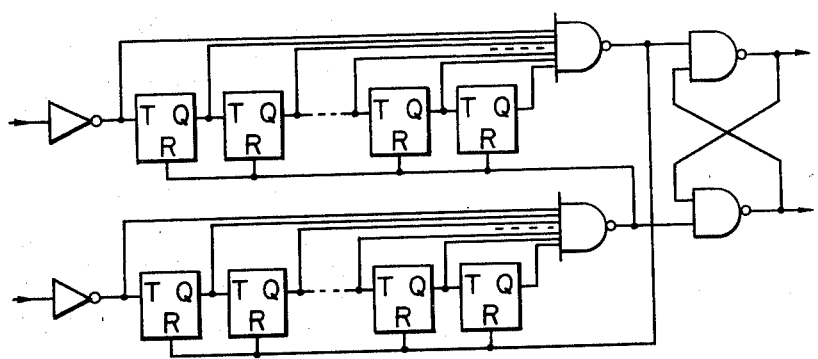
FIGS. 9A and 9B are block diagrams showing examples of an erroneous operation preventing circuit employed in the device according to the invention.
Figure 9B:
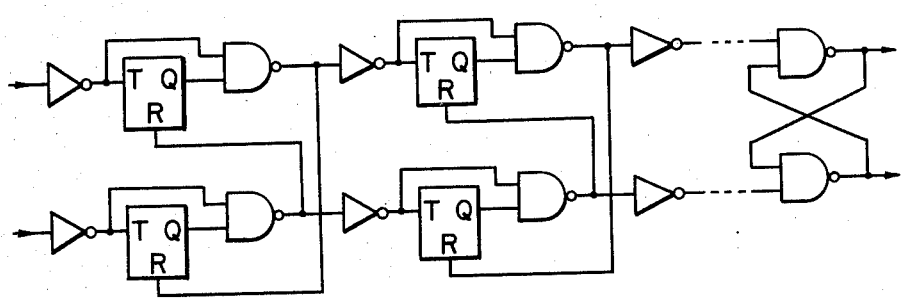

FIGS. 9A and 9B show modifications of the erroneous operation preventing circuit 28. The modification in FIG. 9A is made up of a counter circuit comprising flip-flop circuits and NAND gates. The modification in FIG. 9B is obtained by arranging a plurality of erroneous operation preventing circuits shown in FIG. 5.

Thus, counting the output signal e provided by the counter circuit 24 by means of the erroneous operation preventing circuit 28 makes it possible to detect two different information signals, which improves the detection accuracy. That is, the detection accuracy is improved by sampling the information signal e.

Figure 10:
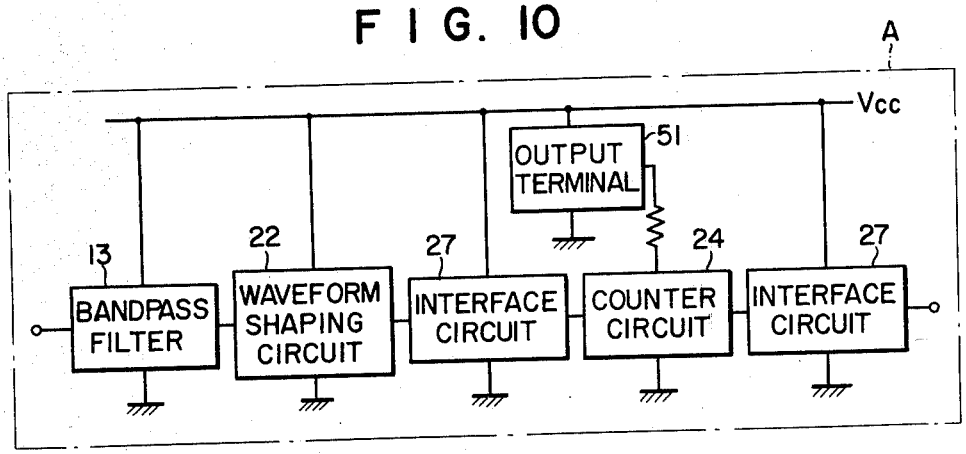
FIG. 10 is a block diagram showing one example of the control signal detecting circuit section provided with an integrated injection logic, in the television sound multiplex broadcast signal receiving device according to the invention.

Variation of the supply voltage may be one of the causes which erroneously operate the counter circuit 24. As the television sound multiplex broadcast signal receiving device is made up of digital circuits as shown in FIG. 10, if the supply voltage is varied, then the supply voltage variation can be a cause to erroneously operate the counter circuit. If, in the case where the supply voltage is greatly varied as described above, a logic circuit constituted by current switching type elements such as integrated injection logic is employed as the counter circuit 24, then the erroneous operation of the counter circuit can be elminated because the logic circuit is a current-controlled element which is controlled by a constant current at all times. Thus, an excellent television sound multiplex broadcast signal receiving device can be provided.

In FIG. 10, reference numeral 13 designates a band pass filter; 22, a waveform shaping circuit for shaping the waveform of the control sub-carrier signal; 27, an interface circuit, and 51, a current source circuit.

One specific feature of the television sound multiplex broadcast signal receiving device according to this invention resides especially in the control signal discrminating section. A device in accordance with the present invention comprises: means for outputting through an AM detector a control signal modulating a 55.1 KHz sub-carrier signal; means for controlling a reference signal inputted to a counter circuit, at the time intervals of the control signal; means for counting the reference signal applied to the counter circuit; and means for identifying a stereophonic broadcast, a difference program broadcast and a monaural broadcast with the aid of an information signal from the counter circuit and the 55.1 KHz sub-carrier signal.

The stable horizontal synchronizing signal available in the television set or the control signal sub-carrier signal is employed as the reference signal source.

In discriminating the control signals by the above-described digital circuit, the use of a current injection logic (I$^2$L) is effective in improving the detection accuracy of the counter circuit.

As the control signal detecting section and the switching signal generating section of the television sound multiplex broadcast signal receiving device according to the invention can be made up of semiconductor integrated circuits as described above, the device has excellent advantages in that the size can be minimized, the number of components can be reduced and the number of manufacturing steps can be reduced when compared with conventional systems.

What is claimed is:

1. A television sound multiplex broadcast signal receiving device comprising:
   (a) means for detecting the arrival of a control subcarrier signal which has been amplitude modulated by a control signal;
   (b) means for detecting said control signal amplitude-modulating said control sub-carrier signal;
   (c) a counter circuit and a means for supplying a reference signal to said counter circuit at time intervals dependent on the frequency of said control signal; and
   (d) means for determining whether a television sound broadcast is a stereophonic broadcast, a different program broadcast or monaural broadcast depending on the presence or absence of a signal from said means for detecting the arrival of a control sub-carrier signal and a signal from said counter circuit.

2. A television sound multiplex broadcast signal receiving device comprising:
   (a) an AM detector and means for outputting through said AM detector a control signal used for modulating a control sub-carrier signal;
   (b) a counter circuit and means for shaping the waveform of said control signal and for applying a reference signal to said counter circuit with a pulse width corresponding to the pulse width of said control signal, said reference signal being counted by said counter circuit; and
   (c) means for determining whether a signal applied thereto is a stereophonic broadcast signal or a different program broadcast signal, with the aid of an information signal provided by said counter circuit, so as to select either a sterophonic broadcast or a different program broadcast.

3. A television sound multiplex broadcast signal receiving device comprising a main channel signal receiving means, an auxiliary channel signal receiving means and a control channel signal receiving means, which device comprises:

(a) means for detecting a control sub-carrier signal which has been amplitude modulated by a control signal;
(b) means for outputting said control signal amplitude-modulating said control sub-carrier signal;
(c) a counter circuit and means for pulse-shaping said control signal and for applying said control sub-carrier signal thus pulse-shaped to said counter circuit at time intervals which are related to the pulse width of said control signal;
(d) means for counting said pulse-shaped control sub-carrier signal applied to said counter circuit and means for providing an information signal; and
(e) means for detecting said control sub-carrier signal to operate said auxiliary channel signal receiving means,
a matrix demodulator being disabled or enabled by said means for detecting said control sub-carrier signal to operate said auxiliary channel signal receiving means and for controlling said information signal outputted by said means for outputting an information signal.

4. A television sound multiplex broadcast signal receiving device comprising a main channel signal receiving means, an auxiliary channel signal receiving means and a control channel signal receiving means, which device comprises:
(a) means for detecting a control sub-carrier signal which has been amplitude modulated by a control signal;
(b) means for outputting said control signal amplitude-modulating said control sub-carrier signal;
(c) a counter circuit and means for pulse-shaping said control signal and for applying a horizontal synchronizing signal to said counter circuit at time intervals which are related to the pulse width of said control signal;
(d) means for counting said horizontal synchronizing signal applied to said counter circuit and means for providing an information signal; and
(e) means for detecting said control sub-carrier signal to operate said auxiliary channel signal receiving means,
a matrix demodulator being disabled or enabled by said means for detecting said control sub-carrier signal to operate said auxiliary channel signal receiving means and for controlling said information signal provided by said information signal outputting means.

5. A television sound multiplex broadcast signal receiving device comprising:
(a) a band pass filter for outputting a control sub-carrier signal which has been amplitude modulated by a control signal;
(b) a pulse shaping circuit for converting a control sub-carrier signal passed through said band pass filter into a pulse signal;
(c) an AM detector for outputting said control signal amplitude-modulating said control sub-carrier signal;
(d) a counter circuit for counting said pulse-shaped control sub-carrier signal during time intervals related to the pulse width of said control signal; and
(e) means for counting an identification information signal generated by said counter circuit and corresponding to said control signal.

6. A device as claimed in claims 1 or 2 or 3 or 4 or 5, wherein said counter circuit comprises integrated injection logic elements.

7. A television sound multiplex broadcast signal receiving device for receiving a television sound broadcast signal and for determining which of a stereophonic broadcast, a monaural broadcast and a different program broadcast the television sound broadcast signal corresponds to, which comprises:
a main channel signal receiving means for receiving a main channel signal; a sub-channel signal receiving means for receiving a sub-channel signal; and a control channel signal receiving means for receiving a control channel signal which includes a control sub-carrier wave signal amplitude-modulated with a control signal adapted to have different respective waveforms for each of said three kinds of television sound broadcast signals;
wherein said control channel signal receiving means comprises:
(a) first means for selecting said control sub-carrier wave which has been amplitude-modulated by said control signal;
(b) second means for detecting said control signal, which has amplitude-modulated said control sub-carrier wave, from said control sub-carrier wave which has been selected by said first means;
(c) third means for shaping said control signal detected by said second means into a pulse signal and for operating a gate circuit for a period of time corresponding to the pulse width of said pulse signal; and
(d) fourth means, including a counter circuit for counting a reference signal supplied by said gate circuit, for providing an information signal used for determining the waveform of the control signal which has been received, and
means for determining the kind of television sound broadcast by using said information signal provided by said fourth means and said control sub-carrier wave.

8. A device as claimed in claim 7, wherein said reference signal is a control sub-carrier wave signal.

9. A device as claimed in claim 7, wherein said reference signal is a horizontal synchronizing signal in a television receiver.

10. A device as claimed in claim 7, further comprising an additional counter, wherein said information signal provided by said counter circuit is counted by said additional counter for detecting erroneous operation of said counter circuit.

11. A device as claimed in claim 7, wherein said control channel signal receiving means comprises integrated-injection logic elements.

* * * * *